H. S. MELLOTT.
METHOD OF PRODUCING A CONDENSED MILK PRODUCT.
APPLICATION FILED APR. 11, 1916.
1,423,810.
Patented July 25, 1922.
2 SHEETS—SHEET 1.
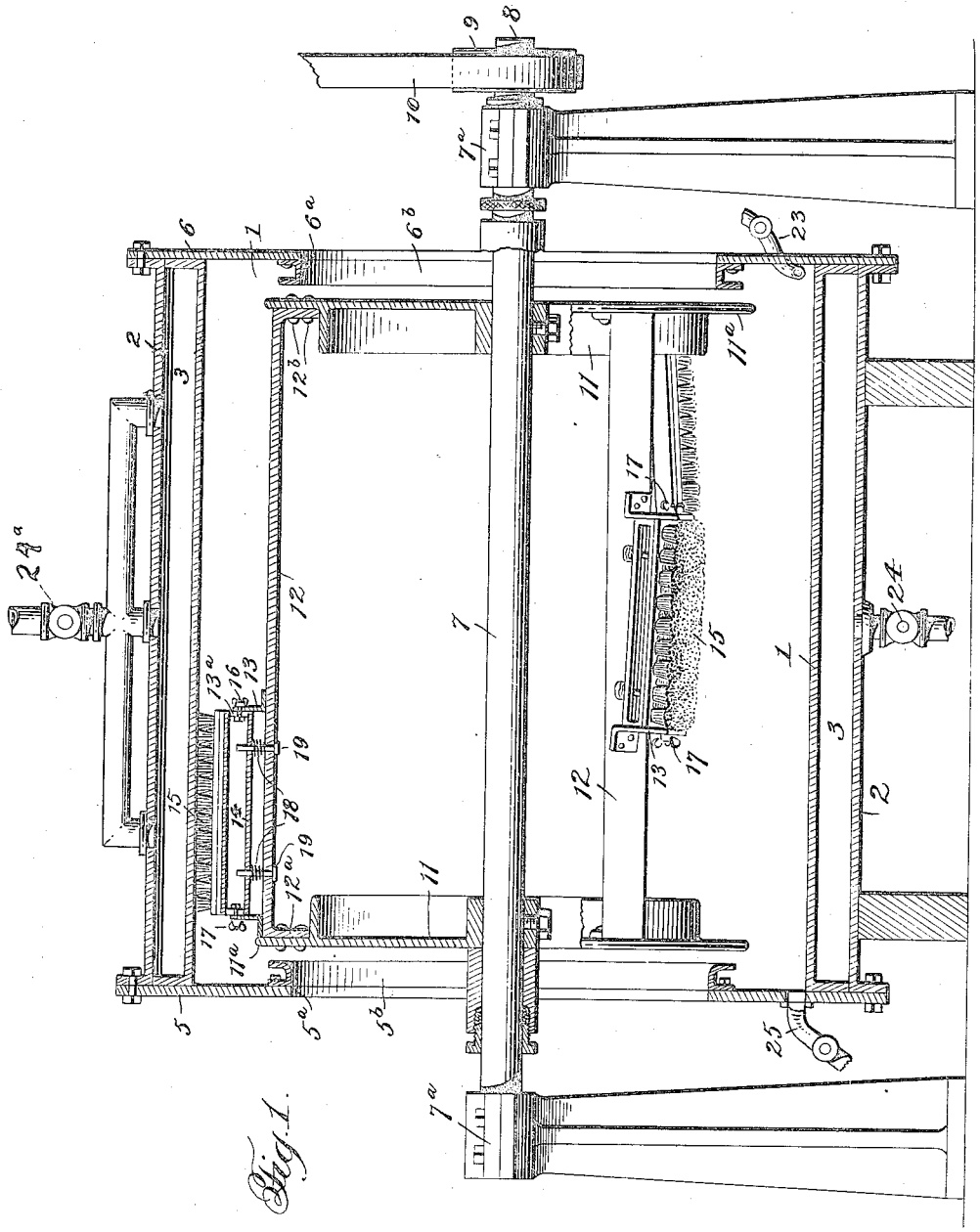

H. S. MELLOTT.
METHOD OF PRODUCING A CONDENSED MILK PRODUCT.
APPLICATION FILED APR. 11, 1916.
1,423,810.
Patented July 25, 1922.
2 SHEETS—SHEET 2.
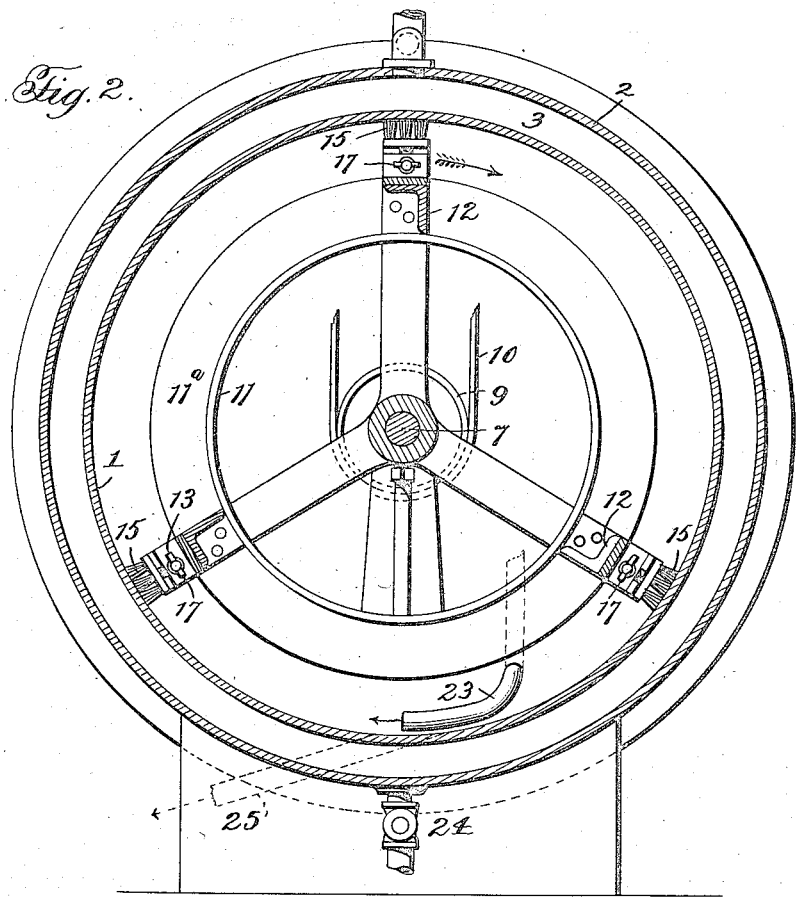
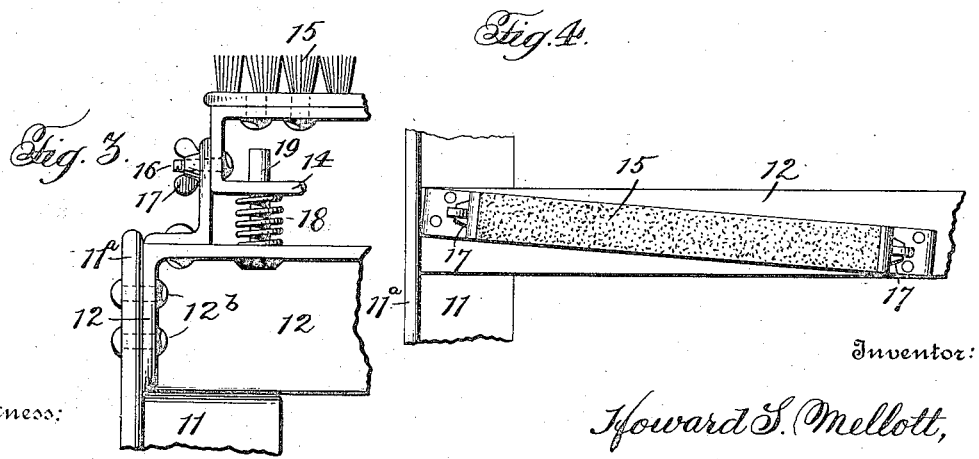
Witness:
Jas. E. Hutchinson
Inventor:
Howard S. Mellott,
By Brent Milans
Attorneys

UNITED STATES PATENT OFFICE.

HOWARD S. MELLOTT, OF MORENCI, MICHIGAN, ASSIGNOR TO THE BY-PRODUCTS RECOVERY CO., OF TOLEDO, OHIO, A CORPORATION OF OHIO.

METHOD OF PRODUCING A CONDENSED-MILK PRODUCT.

1,423,810.    Specification of Letters Patent.    Patented July 25, 1922.

Application filed April 11, 1916. Serial No. 90,393.

*To all whom it may concern:*

Be it known that I, HOWARD S. MELLOTT, a citizen of the United States, residing at Morenci, in the county of Lewanee and State of Michigan, have invented certain new and useful Improvements in Methods of Producing a Condensed-Milk Product, of which the following is a specification, reference being had therein to the accompanying drawings.

This invention relates to an improved method of producing a condensed milk product. In the art of condensing milk by evaporation the more usual and now accepted method employed is that known as the "vacuum pan method." That method or practice of milk condensation has been resorted to for the reason that it has been recognized that in subjecting milk to high temperatures there is a danger of injuring the product by changing its physical characteristics.

Under the "vacuum pan" process, low temperatures may be employed owing to the vacuum or partially maintained vacuum.

The present invention may be stated to be one wherein a high temperature is employed for treating the milk, as distinguished from the low vacuum pan temperatures.

I have found that by practicing the process hereinafter described, milk can be subjected to temperatures ranging well above what has heretofore been regarded as destructive temperatures and still produce a substantially perfect condensed or evaporated product well conditioned for storing in bulk for a considerable period of time as well as for placing in hermetically sealed cans.

The method which I have invented comprehends primarily subjecting a body of milk, while in a relatively shallow spreading or layer, to the action of what I shall term a disruptive temperature, that is a temperature which under ordinary conditions would materially impair the product. Such temperatures may be reckoned as above approximately 180° F.

The milk is allowed to remain but for a short time under the high temperature treatment while the vapors generated are allowed to freely escape. The condensed product is then promptly subjected to the action of a cooling agent which reduces the temperature rapidly to substantially normal.

In carrying out the method any convenient form of apparatus may be employed, but an apparatus for evaporating the milk under the high temperatures and one well designed for carrying out that step of the method will be found disclosed in the application of mine, filed April 19, 1915, Serial No. 22510, entitled Evaporating apparatus. In connection with the use of the apparatus disclosed in this application it has been ascertained that milk can be properly treated at a very high temperature or one which I refer to as a "disrupting" temperature and reduced to its proper condensed condition with great rapidity and with excellent results, and so without burning or scorching or in other respects injuring the product.

Milk is fed in tangentially at one end of a horizontally positioned cylindrical container, the walls of which are heated conveniently through the medium of steam in a steam jacket to such a temperature as will produce rapid evaporation of fluid contents of the milk, the resultant condensed product being discharged at the opposite end of the container. The milk during its treatment is subjected to the rapid rotary movement over the heated walls of the container and is advanced lengthwise thereof, discharging at a point remote from the point of application.

In its heated state the milk is immediately introduced into a cooler of any well known and approved type, and its temperature is lowered to approximately 60° F., more or less, as the conditions may require. In this state the product is in excellent condition for storing purposes or for placing in the now well known hermetically sealed cans for commercial purposes, either as evaporated milk or as condensed milk, the latter having added thereto a certin amount of sugar.

When it is desired to produce an evaporated milk by this process I have found it convenient to in the first instance preheat the milk. This can be accomplished by any of the now known or accepted types of milk heaters or warmers. In this heated state the milk is introduced into the container and is subjected to the heat treatment as above described, the product being promptly cooled. It has been found that evaporated milk produced by the three above referred to steps, as well as the condensed milk, has all of the desired characteristics and sustaining qualities of the now best known brands on the market.

It has been ascertained that by passing the milk rapidly over a highly heated surface it will acquire the necessary condensed characteristic within a very short period of time, ranging in some instances from ten to sixty seconds and will thereafter issue from the machine in the above stated highly heated state after which it is promptly cooled. The treating surface may be heated well above 212° F., while the temperature of the product being treated may range according to the volume and conditions from 180 to 212°.

I have employed the word "disrupting" in connection with the evaporating temperature with a view of defining a temperature which would have a tendency to impair the physical characteristic of the milk.

In the accompanying drawings I have illustrated an apparatus or machine useful in carrying out the process, though it is to be understood that the method may be carried out with other types of machines or apparatus.

In the drawings:

Figure 1 is an elevation, partly in section, of an apparatus for the described purpose;

Figure 2 is a transverse section, and

Figures 3, and 4 are detail views of the conveyor and cleansing mechanism.

With more particular reference to the drawings, wherein like reference numerals refer to corresponding parts throughout the several views, 1 is a container preferably cylindrical in form, and having a surrounding jacket 2, whereby to form a chamber 3, entirely surrounding the container 1, and adapted for the reception of steam or the like, whereby to impart to the surface of the container, a temperature different from that of the material or substance to be treated. The container is preferably stationary, being supported in place, in any desired manner, as by feet or standards.

In that form of apparatus illustrated in the drawings, the cylindrical container has openings $5^a$ and $6^a$, respectively, in its ends 5 and 6, but it is to be understood that one or both of the ends may be open or closed in the treatment of certain substances. A suitable collar $5^b$ and $6^b$, respectively, projects inwardly from the end walls 5 and 6, whereby to prevent any of the material running over the edges of the wall surrounding the openings $5^a$ and $6^a$.

Positioned within the cylindrical container is novel means for engaging the substance to be treated and applying the same, under centrifugal force, to the interior surface of the container, in the form of a film or layer, and for imparting movement to said layer over said surface. In the preferred embodiment of the invention this same means is preferably utilized for the continuous cleansing of the interior surface of the container, and removing any particles thereof which might tend to adhere to the surface.

A shaft 7 is provided, the same extending horizontally and substantially centrally within the container. The container may, if desired, be arranged at a slight downward inclination towards the outlet end thereof. The shaft 7 has suitable bearings $7^a$ at the end walls of the container, one end 8 of the shaft projecting beyond the adjacent end wall and having mounted thereon a suitable pulley 9. The pulley 9 is fixed to the shaft whereby the shaft is moved thereby and means, as a belt 10, driven in any desired manner, by mechanism not shown, but adapted to rotate the pulley and shaft at a high rate of speed, say from 200 to 500 revolutions per minute.

Fixed to the shaft, for movement therewith, are supporting webs 11, there conveniently being two of said webs, one adjacent each end of the shaft. One or more intermediate supports may be provided as desired. Projecting between the webs 11, and secured to the periphery thereof, in any desired manner, are supporting bars 12. These bars 12 conveniently have offset terminals $12^a$ secured as by bolts or rivets $12^b$ to peripheral flanges $11^a$ on the webs 11. Any number of such bars may be employed, three being illustrated and arranged substantially equi-distant apart from the periphery of the webs 11.

Supported on the bars 12 are brackets 13, upon which are adjustably mounted supports 14, which latter preferably take an inverted U-shaped formation. The connection between the supports 14 and brackets 13 is preferably a movable one, the support 14 being provided with a vertically extending slotted way $13^a$, and the side arms of the support 14 having projecting therefrom a pin 16 loosely engaging in said slotted way. A nut 17 is provided, the same having threaded engagement with the pin and adapted to be adjusted into a position to prevent any unnecessary lateral play while permitting of relative sliding movement between the members 13 and 14.

While it will be appreciated that by reason of the loose support for the conveyor members the same in the rotary movement of the shaft 7 will be forced outwardly by centrifugal force into contact with the surface of the container, means are provided, however, for yieldably supporting the conveyor members and to maintain the same normally adjacent to, or in contact with, the surface, and with this in view suitable spiral springs 18 are employed, the same being sleeved upon pins 19, projecting between the offset flanges 14ᵇ of the side arms of the support 14 and the horizontal bar 12. The tendency of the springs is to exert outward pressure on the support 14, and cause the conveyor members to assume a position adjacent to or in contact with the surface of the container.

The conveyor members preferably take the form of brushes 15, the same acting, when in contact with the surface of the container, to remove adhering particles of the substance from the surface of the container. While these conveyor and cleansing brushes 15 may extend from end to end of the horizontal bars 12, satisfactory results are obtained by forming the same in relatively short sections, and in so positioning each section on the bars 12, that they successively act upon a different portion of the treating surface. There being three horizontal bars 12 illustrated, a brush section is provided for each bar, that brush adjacent the inlet end of the machine terminating at a point substantially in line with the inner end of the brush of the next succeeding bar 12, and this brush, in turn, terminating at a point substantially in line with the inner end of the brush of the next succeeding bar, which latter brush projects to a point substantially in line with the rear end web 11.

In the apparatus, as illustrated, the supports at opposite ends of the brush carrying frames are slightly laterally offset with respect to one another on the supports 12, whereby the brushes extend at a slight inclination or angle to the longitudinal axis of said bars 12. Though this feature of the invention is not limited to the arrangement of brushes alluded to, it is found that this peculiar disposition of the brushes has a tendency to assist in the rapid and continuous flow of the material in layer formation towards the outlet end of the container.

It will be noted that the brushes are readily detachable for cleansing purposes, etc., by releasing the pin 16 and nut 17, and it will also be observed that by tightening the nut 17, the conveyor supports 14 which are normally, resiliently, supported, may be rigidly supported in position, and that this position may be readily adjusted by means of the pin and slot connection 16—13ᵃ.

A suitable inlet for steam or the like is preferably provided at the top of the apparatus, illustrated at 24ᵃ, whereby to introduce the heating medium into the steam chamber 3.

A suitable outlet from the steam chamber is provided at 24.

A suitable inlet for the material, such as milk, to be treated, is provided at 23.

The outlet for the material, after treatment, is conveniently provided in the periphery of the container, adjacent the rear end thereof, and arranged tangentially, as illustrated at 25. The milk is promptly cooled in any desired manner by being subjected to a cooling agency, as by delivering the same from the tangential outlet into a cooling tank of any approved type.

The apparatus herein described is not claimed herein, but made the subject matter of my copending application previously referred to.

It is also to be understood that wherein specific degrees of heat and cool or cold temperatures are referred to, I do not wish to be limited in these particulars as variations in the temperatures are contemplated by this method.

Having thus decscribed the invention, what is claimed is:

1. The method of treating milk to produce a condensed product consisting in subjecting the milk for a short period of time to a disrupting temperature, permitting the generated vapors to escape during the treatment, and finally subjecting the product while in its heated state to the action of a cooling agent.

2. The mehod of treating milk to change its consistency consisting in projecting the milk in layer form rapidly and for a short period of time over a heated surface, subjecting the layer to a disrupting temperature, causing the milk to depart from the heated surface and while in its heated state subjecting the product to the action of a cooling agent to promptly reduce its temperature.

3. The method of treating milk to produce a condensed product consisting in subjecting the milk in layer form and for a short period of time to a heating temperature above approximately 180° F., rapidly moving the milk while under the influence of the heat, permitting the vapors to escape, and immediately rapidly cooling the product after it is allowed to escape from the influence of the treating temperature.

4. The art of producing a condensed milk product consisting in preheating the milk, passing the preheated milk rapidly over a treating surface, subjecting the milk for a short period of time to a temperature above approximately 180° F., and rapidly cooling the product immediately upon its departure from the heating surface.

5. The art of treating milk to produce a condensed product consisting in causing the milk to pass rapidly over a heated surface causing the milk to remain in contact with the heated surface for a short period of time, permitting the vapors to escape and subjecting the condensed product while in a heated state to the action of a cooling agent which promptly reduces its temperature, substantially as described.

6. The method of producing a condensed milk product consisting in introducing the milk into a container of circular cross section, heating the milk in said container to a temperature to which milk under normal conditions cannot be subjected even for relatively brief periods of time without material injury to the constituents to vaporize a portion of the liquid thereof, shaping the milk in the form of a layer upon the surface of the container, rapidly moving the layer circularly over the surface and simultaneously causing the entire body of milk to move from the point of introduction toward the opposite end of the container, permitting the vapor to escape inwardly from the layer and freely from the container and immediately cooling the milk upon completion of the condensing operation.

In testimony whereof I hereunto affix my signature in the presence of two witnesses.

HOWARD S. MELLOTT.

Witnesses:
H. THANE BAUMAN,
A. B. HUMPHREY.